United States Patent [19]

Dong

[11] Patent Number: 5,734,426
[45] Date of Patent: Mar. 31, 1998

[54] METHOD OF AUTOMATIC EXPOSURE CONTROL IN A MOS IMAGING ARRAY

[75] Inventor: Kimble Dong, San Jose, Calif.

[73] Assignee: OmniVision Technologies, Inc., Sunnyvale, Calif.

[21] Appl. No.: 749,706

[22] Filed: Nov. 15, 1996

[51] Int. Cl.$^6$ .................................................. H04N 9/083
[52] U.S. Cl. .................................. 348/297; 348/362
[58] Field of Search ............................... 348/362, 363, 348/364, 297, 296, 302, 308, 314

[56] References Cited

U.S. PATENT DOCUMENTS

| | | | |
|---|---|---|---|
| 5,036,400 | 7/1991 | Haruki | 348/364 |
| 5,128,769 | 7/1992 | Arai et al. | 348/363 |
| 5,264,940 | 11/1993 | Komiya et al. | 348/362 |
| 5,299,015 | 3/1994 | Imaide et al. | 348/229 |
| 5,329,372 | 7/1994 | Nakamura | 348/302 |
| 5,585,942 | 12/1996 | Kondo | 348/297 |
| 5,638,118 | 6/1997 | Takahashi et al. | 348/362 |

*Primary Examiner*—Andrew Faile
*Assistant Examiner*—Aung S. Moe
*Attorney, Agent, or Firm*—Christensen, O'Connor, Johnson & Kindness PLLC

[57] ABSTRACT

In a MOS imaging array, it is important to control the exposure time of the array to incident light. For varying changes in ambient light, the exposure time of the array must be changed. The present invention describes a method for controlling the exposure time of the imaging array. Each of the intensities of the pixels in a frame are analyzed to provide an indication of the number of pixels having an intensity above and below predetermined thresholds, NW and NB, respectively. If NW is above a predetermined threshold, KW, then an adjustment in the exposure time may be made. If not, then no adjustment is made.

3 Claims, 2 Drawing Sheets

METHOD OF AUTOMATIC EXPOSURE CONTROL IN A MOS IMAGING ARRAY

FIELD OF THE INVENTION

The present invention relates to metal oxide semiconductor (MOS) imaging arrays, and, more particularly, to a method of controlling an exposure time of the imaging array.

BACKGROUND OF THE INVENTION

Integrated circuit technology has revolutionized various fields, including computers, control systems, telecommunications and imaging. In the field of imaging, the charge coupled device (CCD) sensor has made it possible to manufacture relatively low cost and small hand held video cameras. Nevertheless, the solid state CCD integrated circuits needed for imaging are relatively difficult to manufacture, and therefore are expensive. In addition, because of the different processes involved in the manufacture of CCD integrated circuits relative to MOS integrated circuits, the single processing portion of the imaging sensor has typically been located on a separate integrated chip. Thus, a CCD imaging device includes at least two integrated circuits: One for the CCD sensor, and one for the single processing logic.

An alternative low cost technology to CCD integrated circuits is the metal oxide semiconductor (MOS) integrated circuit. Not only are imaging devices using MOS technology less expensive to manufacture relative to the CCD imaging device, but also for certain applications MOS devices are of superior performance. For example, the pixel elements in a MOS device can be made smaller and therefore provide a higher resolution than CCD image sensors. In addition, the single processing logic necessary can be integrated alongside the imaging circuitry, thus allowing for a single integrated chip to form a complete standalone imagining device.

Examples of MOS imaging devices are detailed in "a ¼ inch format 250K pixel amplified MOS image sensor using CMOS process" by Kawashima et al., *IDEM*, 93–575 (1993), and in "a low noise line-amplifier MOS imaging device" by Ozaki et al., *IEEE Transactions on Electron Devices*, vol. 38, no. 5, May 1991. In addition, U.S. Pat. No. 5,345,266 to Denyer, titled "Matrix Array Image Sensor Chip," describes a MOS image sensor. The devices disclosed in these publications provide a general design approach to MOS imaging devices.

The primary building block of an image formed by a MOS imaging device is a pixel. The number, size and spacing of the pixels determine the resolution of the image generated by the imaging device. The pixels of a MOS imaging device are semiconductor devices that transform incident light photons into current signals. The signal produced by each pixel is generally small, in the nano ampere range.

One important parameter that the MOS imaging device must be able to control is the exposure time of each pixel to incident light. Similar to light exposure time for photographic film, the exposure time of each pixel must be adjusted to compensate for variations in lighting conditions, such as for indoor or outdoor lighting. An exposure time that is too long will result in an image that is overly bright and washed out. In contrast, an exposure time that is too short will result in an image that is dark and difficult to view.

The present invention is directed towards a method for automatically controlling the exposure time for each pixel in an MOS imaging array.

SUMMARY OF THE INVENTION

A method of automatically controlling the exposure time of a MOS imaging array is disclosed. The method comprises the steps of determining a value NW as the number of pixels in said imaging array that output a pixel signal greater than a predetermined high threshold; determining a value NB as the number of pixels in said imaging array that an output a pixel signal less than a predetermined low threshold; and determining if NW is greater than a predetermined value KW, and if so, determining whether or not the absolute value of NW minus NB is greater than a predetermined value KD, and if so, then decreasing said exposure time if NW>NB and increasing said exposure time if NW<NB.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
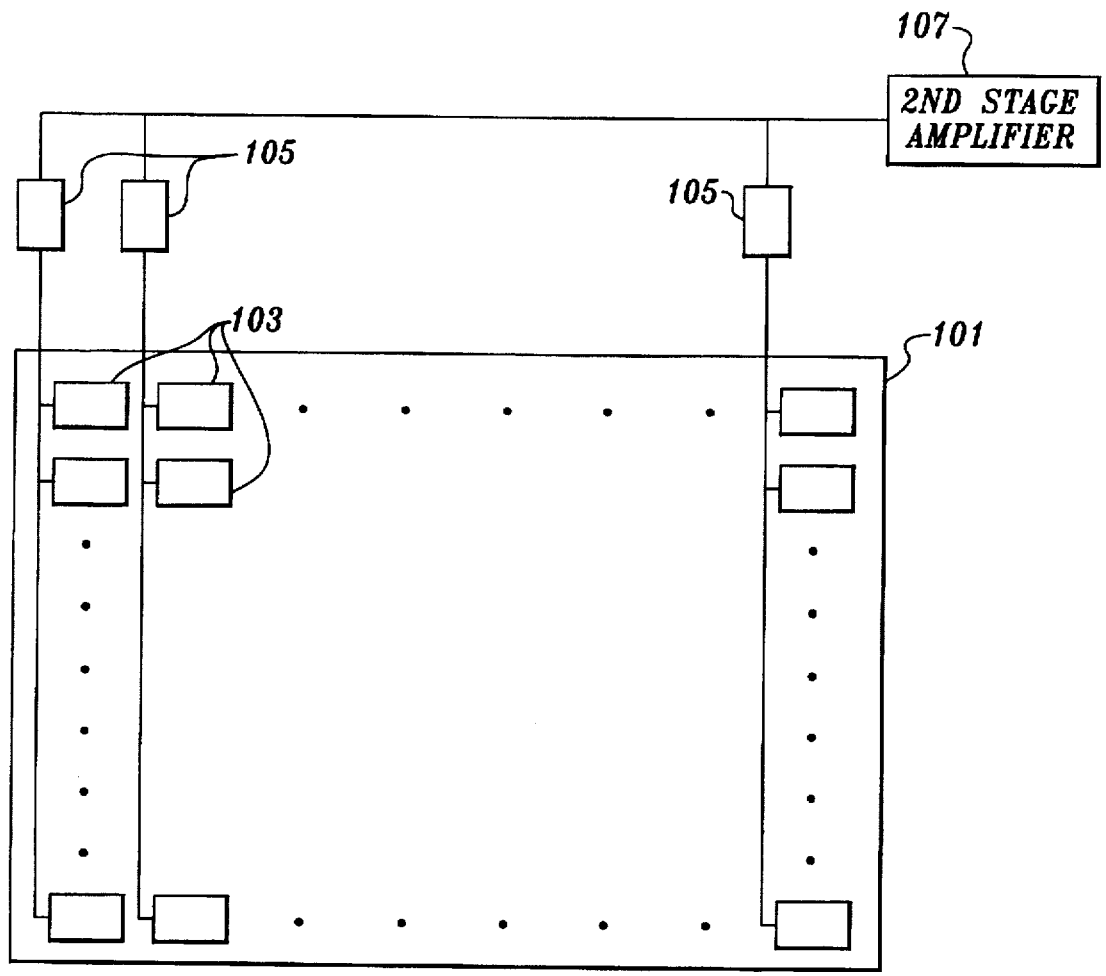
FIG. 1 is a schematic diagram of a CMOS imaging array.

With reference to FIG. 1, an architecture for a CMOS imaging array 101 includes a rectangular matrix of pixels 103. The number of pixels in the horizontal or X direction and the number of pixels in the vertical or Y direction constitutes the resolution of the imaging array 101. Each of the pixels 103 in a vertical column routes its signal to a single charge amplifier 105.

The retrieval of information from the pixels 103 follows the well known raster scanning technique. In particular, a roll of pixels 103 scans sequentially from left to right. The next roll is then scanned in this manner until all rolls have been scanned sequentially from top to bottom. At the end of each complete scan of the entire array 101, a vertical blanking period of a predetermined time occurs until the Raster scanning pattern is repeated. This type of scanning follows the NTSC scanning scheme. Controlled circuitry of conventional design is operative to sequentially read the pixels 103 in this manner.

As each pixel is scanned, the signal from the pixel is provided to the charge amplifier 105 for that column. Thus, the charge amplifiers 105 receive the signals sequentially. The sequential signals from the charge amplifiers 105 are then forwarded to a second stage amplifier 107, which amplifies the signals so that they can be further processed.

The present invention uses the magnitudes of the amplified signals from each of the pixels to determine the exposure time for each pixel. Generally speaking, the exposure time for each pixel can be varied by controlling the raster scan control algorithm.

Figure 2:
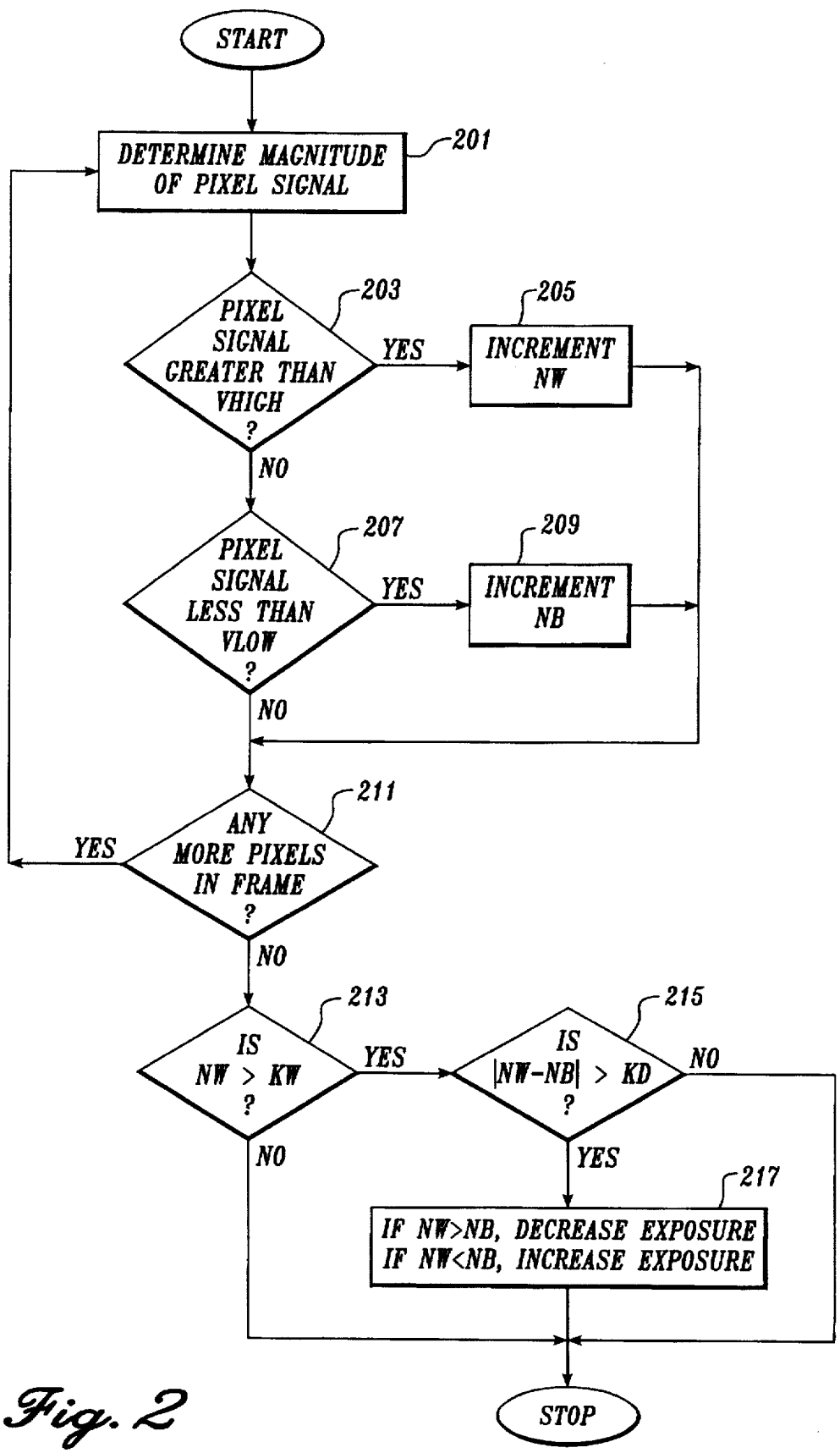
FIG. 2 is a flow diagram illustrating the method of the present invention.

The method of the present invention is shown in FIG. 2. At box 201, the magnitude of a pixel signal from a pixel in the array is determined. Next, at box 203, a determination is made as to whether the pixel signal is greater than a predetermined value Vhigh. Typically, the pixel signal will be between 0.3 volts and 1.0 volts. This voltage level is set by the NTSC television standard. Moreover, a typical value for Vhigh is 0.8 volts. If the magnitude of the pixel signal is greater than Vhigh, then at box 205 a counter, NW, is incremented by 1. After incrementing, the next step is at box 211.

However, if at box 203, the pixel signal is not greater than Vhigh, then a determination is made as to whether the pixel signal is less than another predetermined threshold value, Vlow. In one preferred embodiment, Vlow is 0.5 volts. If the pixel signal is less than Vlow, then at box 209, a counter, NB, is incremented by 1. After box 209, control is provided to box 211.

If at box 207, the pixel signal is not less than the value Vlow, next, at box 211, a determination is made as to whether or not any more pixels in the frame still need to be analyzed. If so, the process of boxes 201–209 are repeated. However, if the entire pixel array of the frame has been analyzed, then at box 213, a determination is made as to whether or not the counter NW is greater than a predetermined threshold value KW. Typically, KW is a number that is between 2% and 5% of the total number of pixels in the imaging array.

If NW is not greater than KW, then there is no changing of exposure time, and the analysis for that frame is complete. However, if NW is greater than KW, then at box 215, a determination is made as to whether or not the absolute value of NW minus NB is greater than a predetermined threshold number KD. The predetermined threshold number KD is typically between 2% and 5% of the total number of pixels in the imaging array. If the absolute value is less than KD, then no exposure changes are made.

However, if the absolute value of NW minus NB is greater than KD, then at box 217, if NW is greater than NB, the exposure time is decreased. However, if NW is less than NB, then the exposure time is increased. Typically, the increments of increase and decease of exposure time are approximately 6% of the previous exposure time.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of automatically controlling the exposure time of a MOS imaging array, said imaging array being formed from a matrix of individual pixels, said method comprising the steps of:

determining a value NW as the number of pixels in said imaging array that output a pixel signal greater than a predetermined high threshold;

determining a value NB as the number of pixels in said imaging array that output a pixel signal less than a predetermined low threshold; and determining if NW is greater than a predetermined value KW, and if so, determining whether or not the absolute value of NW minus NB is greater than a predetermined value KD, and if so, then decreasing said exposure time if NW>NB and increasing said exposure time if NW<NB.

2. The method of claim 1 wherein said step of decreasing or increasing said exposure time is done in steps of substantially 6% of said exposure time.

3. The method of claim 1 wherein said predetermined values of KD and KW are 2%–5% of the total number of pixels in said imaging array.

\* \* \* \* \*